(12) United States Patent
Yasuoka et al.

(10) Patent No.: US 12,741,337 B2
(45) Date of Patent: Sep. 22, 2026

(54) WELDING METHOD AND WELDING APPARATUS

(71) Applicant: FURUKAWA ELECTRIC CO., LTD., Tokyo (JP)

(72) Inventors: Tomomichi Yasuoka, Tokyo (JP); Takashi Kayahara, Tokyo (JP); Toshiaki Sakai, Tokyo (JP); Ryosuke Nishii, Tokyo (JP); Takashi Shigematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 1009 days.

(21) Appl. No.: 17/066,535

(22) Filed: Oct. 9, 2020

(65) Prior Publication Data

US 2021/0031301 A1 Feb. 4, 2021

Related U.S. Application Data

(63) Continuation of application No. PCT/JP2019/017087, filed on Apr. 22, 2019.

(30) Foreign Application Priority Data

Apr. 20, 2018 (JP) ................................ 2018-081755

(51) Int. Cl.
*B23K 26/06* (2014.01)
*B23K 26/064* (2014.01)
(Continued)

(52) U.S. Cl.
CPC ...... *B23K 26/0608* (2013.01); *B23K 26/0648* (2013.01); *B23K 26/0676* (2013.01);
(Continued)

(58) Field of Classification Search
CPC ........... B23K 26/0608; B23K 26/0648; B23K 26/0676; B23K 26/24; B23K 26/073;
(Continued)

(56) References Cited

U.S. PATENT DOCUMENTS 4,857,699 A 8/1989 Duley et al.
5,269,056 A 12/1993 Yang et al.
(Continued)

FOREIGN PATENT DOCUMENTS

CN 102476242 A 5/2012
CN 106392305 A 2/2017
(Continued)

OTHER PUBLICATIONS

Korean Office Action issued Sep. 5, 2023 in Korean Patent Application No. 10-2020-7029690 (with English machine translation), 10 pages.

(Continued)

*Primary Examiner* — Vy T Nguyen
(74) *Attorney, Agent, or Firm* — Oblon, McClelland, Maier & Neustadt, L.L.P.

(57) ABSTRACT

A welding method includes: arranging a workpiece containing copper in a region to be irradiated with laser light; and irradiating the workpiece with the laser light to melt and weld an irradiated portion of the workpiece. Further, the laser light is formed of a main beam and a plurality of sub beams, and a ratio of power of the main beam to total power of the plurality of sub beams is 72:1 to 3:7.

9 Claims, 11 Drawing Sheets

(51) Int. Cl.
*B23K 26/067* (2006.01)
*B23K 26/08* (2014.01)
*B23K 26/24* (2014.01)
*B23K 103/12* (2006.01)

(52) U.S. Cl.
CPC .............. *B23K 26/08* (2013.01); *B23K 26/24* (2013.01); *B23K 2103/12* (2018.08)

(58) Field of Classification Search
CPC ........................... B23K 26/21; B23K 2101/36; B23K 2101/38; B23K 26/0604; B23K 26/064; B23K 26/082; B23K 26/361; B23K 2101/40; B23K 2103/10; B23K 26/0624; B23K 26/0643; B23K 26/0734; B23K 26/0738; B23K 26/0853; B23K 26/0876; B23K 26/211; B23K 26/53; B23K 26/704; B23K 2101/34; B23K 2101/35; B23K 2103/08; B23K 2103/50; B23K 2103/56; B23K 26/032; B23K 26/042; B23K 26/0613; B23K 26/0673; B23K 26/08; B23K 26/14; B23K 26/1476; B23K 26/34; B23K 26/40; B23K 26/703; B23K 1/0056; B23K 1/20; B23K 2101/045; B23K 2101/185; B23K 2101/32; B23K 2103/04; B23K 2103/12; B23K 2103/52; B23K 26/0006; B23K 26/0093; B23K 26/02; B23K 26/035; B23K 26/06; B23K 26/062; B23K 26/0622; B23K 26/0626; B23K 26/0652; B23K 26/0665; B23K 26/067; B23K 26/206; B23K 26/242; B23K 26/244; B23K 26/26; B23K 26/28; B23K 26/32; B23K 26/352; B23K 26/354; B23K 26/60; B23K 26/702; B23K 35/0238; B23K 35/0261; B23K 35/282; B23K 35/286; G02B 19/0023; G02B 19/0047; G02B 27/0905; G02B 27/0927; G02B 27/1006; G02B 27/106; G02B 27/123; G02B 27/143; G02B 27/283; G02B 27/285; G02B 27/286
USPC ............ 219/121.68, 121.69, 121.74, 121.76; 359/853
See application file for complete search history.

(56) References Cited

U.S. PATENT DOCUMENTS

| | | | | |
|---|---|---|---|---|
| 9,044,824 | B2 | 6/2015 | Olsen | |
| 2010/0044353 | A1 | 2/2010 | Olsen | |
| 2011/0116518 | A1 | 5/2011 | Andreasch et al. | |
| 2015/0224597 | A1 | 8/2015 | Olsen | |
| 2015/0360320 | A1* | 12/2015 | Yoshida | B23K 26/206 219/121.64 |
| 2017/0028507 | A1 | 2/2017 | Tsukui | |
| 2017/0182599 | A1 | 6/2017 | Tsukui | |
| 2019/0118299 | A1* | 4/2019 | Kangastupa | G02B 6/02042 |
| 2019/0389001 | A1 | 12/2019 | Yasuoka et al. | |

FOREIGN PATENT DOCUMENTS

| | | | |
|---|---|---|---|
| CN | 107848069 | A | 3/2018 |
| EP | 2 960 005 | A1 | 12/2015 |
| JP | 63-273587 | A | 11/1988 |
| JP | 63-295093 | A | 12/1988 |
| JP | 06-198470 | A | 7/1994 |
| JP | 2002-301583 | A | 10/2002 |
| JP | 2009-195947 | A | 9/2009 |
| JP | 2010-508149 | A | 3/2010 |
| JP | 2011-224618 | A | 11/2011 |
| JP | 2012-110905 | A | 6/2012 |
| JP | 2015-205327 | A | 11/2015 |
| JP | 2015-217422 | A | 12/2015 |
| JP | 2016-46132 | A | 4/2016 |
| JP | 2017-123318 | A | 7/2017 |
| JP | 2018-51607 | A | 4/2018 |
| JP | 7269226 | B2 | 5/2023 |
| KR | 10-2017-0076574 | A | 7/2017 |
| WO | WO 2018/011456 | A1 | 1/2018 |
| WO | WO 2018/159857 | A1 | 9/2018 |

OTHER PUBLICATIONS

Japanese Notice of Reasons for Revocation issued Jan. 25, 2024 in Japanese Patent Application No. 2020-514472 (with unedited computer-generated English Translation), 14 pages.
Notice of Reason for Revocation issued Oct. 1, 2024, in corresponding Japanese Patent Application No. 2020-514472 (with English Translation), 47 pages.
Combined Chinese Office Action and Search Report issued Oct. 21, 2021 in Patent Application No. 201980026538.0 (with English machine translation and English translation of Category of Cited Documents), 21 pages.
Extended European Search Report issued Dec. 13, 2021 in European Patent Application No. 19787989.3, 8 pages.
"Corporate Information—Panasonic IP Management Co., Ltd.", Panasonic, Retrieved on Apr. 4, 2025, 6 pages (with partial unedited computer-generated English translation).
"Inquiry Regarding Progress Information", Patent Application No. 2014-103579, Publication No. 2015-2174221, Retrieved on Apr. 4, 2025, 1 page (with partial unedited computer-generated English translation).
International Search Report issued Jul. 16, 2019 in PCT/JP2019/017087 filed on Apr. 22, 2019, 1 pages.
Japanese Office Action issued Jan. 20, 2026 in Japanese Patent Application No. 2023-69779 (with unedited computer-generated English translation), 9 pages.

* cited by examiner

WELDING METHOD AND WELDING APPARATUS

CROSS-REFERENCE TO RELATED APPLICATION(S)

This application is a continuation of International Application No. PCT/JP2019/017087, filed on Apr. 22, 2019 which claims the benefit of priority of the prior Japanese Patent Application No. 2018-081755, filed on Apr. 20, 2018, the entire contents of which are incorporated herein by reference.

BACKGROUND

The present disclosure relates to a welding method and a welding apparatus.

Laser welding is known as one of techniques for welding a workpiece that is made of a metal material. Laser welding is a welding method including irradiating a portion to be welded in a workpiece with laser light and melting the portion by energy of the laser light. A liquid pool of molten metal called a weld pool is formed in the portion irradiated with the laser light, and subsequently the weld pool solidifies, so that welding is performed.

In addition, when a workpiece is to be irradiated with laser light, a profile of the laser light may be formed in accordance with purposes of irradiation. For example, a technique for forming a profile of laser light in a case where the laser light is used to cut a workpiece is known (see, for example, see Japanese Translation of PCT International Application Publication No. 2010-508149).

SUMMARY

There is a need for providing a welding method and a welding apparatus capable of preventing occurrence of a welding defect, such as a blowhole, when a workpiece containing copper is subjected to laser welding.

According to an embodiment, a welding method includes: arranging a workpiece containing copper in a region to be irradiated with laser light; and irradiating the workpiece with the laser light to melt and weld an irradiated portion of the workpiece. Further, the laser light is formed of a main beam and a plurality of sub beams, and a ratio of power of the main beam to total power of the plurality of sub beams is 72:1 to 3:7.

According to an embodiment, a welding apparatus includes: a laser device; and an optical head that irradiates a workpiece containing copper with laser light that is output from the laser device, to thereby melt and weld an irradiated portion of the workpiece. Further, the laser light for irradiating the workpiece is formed of a main beam and a plurality of sub beams, and a ratio of power of the main beam to total power of the plurality of sub beams is 72:1 to 3:7.

DETAILED DESCRIPTION

In the related art, a member containing copper, such as a member made of high purity copper or a member made of a copper alloy, is frequently used as a structural member of a conductive part or a heat dissipation part in vehicle parts or electric/electronic device parts. Hereinafter, the member containing copper may be described as a copper member. Copper has high thermal conductivity, so that energy applied thereto is easily dissipated as heat. Therefore, copper members are considered as members that are difficult to be bonded together. Meanwhile, to reduce a size of a part in which the copper member is used or to increase a processing speed, application of laser welding has attracted attention. Meanwhile, the processing speed is a sweep rate when welding is performed by causing laser light to sweep over a workpiece.

The inventors of the present disclosure constructed a workpiece by arranging two copper members in an overlapping manner and performed examination on bonding through laser welding, and it was observed that sputter occurred or a welding defect, such as a blowhole, occurred in some cases. In particular, it was found that the blowhole was likely to occur when the processing speed was reduced in order to increase a depth of a weld pool (weld depth), for example. Meanwhile, it is necessary to ensure, as the weld depth, a certain depth that is needed for welding depending on thicknesses of the copper members or the like.

Embodiments of the present disclosure will be described in detail below with reference to the accompanying drawings. The present disclosure is not limited by the embodiments described below. In addition, in description of the drawings, the same or corresponding elements are appropriately denoted by the same reference symbols.

First Embodiment

Figure 1:
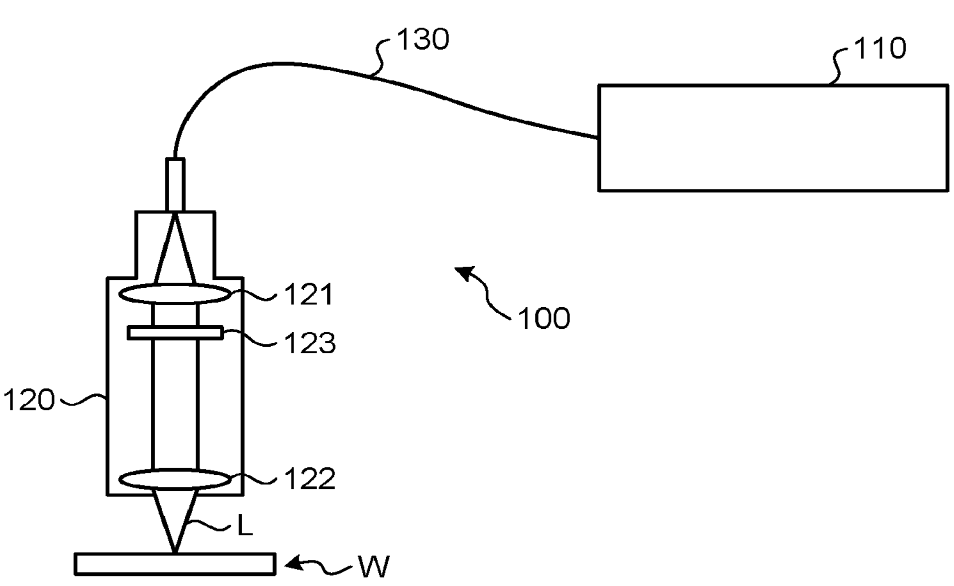
FIG. 1 is a schematic diagram illustrating an overall configuration of a laser welding apparatus according to a first embodiment.

FIG. 1 is a schematic diagram illustrating an overall configuration of a laser welding apparatus according to a first embodiment. A laser welding apparatus 100 includes a laser device 110, an optical head 120, and an optical fiber 130 that connects the laser device 110 and the optical head 120. Further, a workpiece W is made of pure copper with purity of, for example, 99.9% or higher, and has a plate shape with a thickness of, for example, about 1 mm to 10 mm.

The laser device 110 is configured to be able to output laser light at power of several kW, for example. For example, the laser device 110 may include a plurality of semiconductor laser elements inside thereof, and may be configured to be able to output multi-mode laser light at power of several kW as total output power of the plurality of semiconductor laser elements. Further, the laser device 110 may include various laser light sources, such as a fiber laser, a YAG laser, and a disk laser. The optical fiber 130 guides the laser light output from the laser device 110 and allows the laser light to be input to the optical head 120.

The optical head 120 is an optical device for causing the laser light input from the laser device 110 to be emitted toward the workpiece W. The optical head 120 includes a collimating lens 121 and a condensing lens 122. The collimating lens 121 is an optical system for collimating the input laser light. The condensing lens 122 is an optical system for condensing the collimated laser light and applying the condensed light, as laser light L, to the workpiece W.

The optical head 120 is configured such that a relative position thereof with respect to the workpiece W is changeable in order to sweep the laser light L while the workpiece W is irradiated with the laser light L. A method for changing the relative position with respect to the workpiece W includes moving the optical head 120 itself, moving the workpiece W, and the like. That is, the optical head 120 may be configured to allow the laser light L to sweep the workpiece W that is fixed. Alternatively, it may be possible to fix an irradiation position of the laser light L from the optical head 120, and hold the workpiece W such that the workpiece W is movable with respect to the fixed laser light L.

Figure 2:
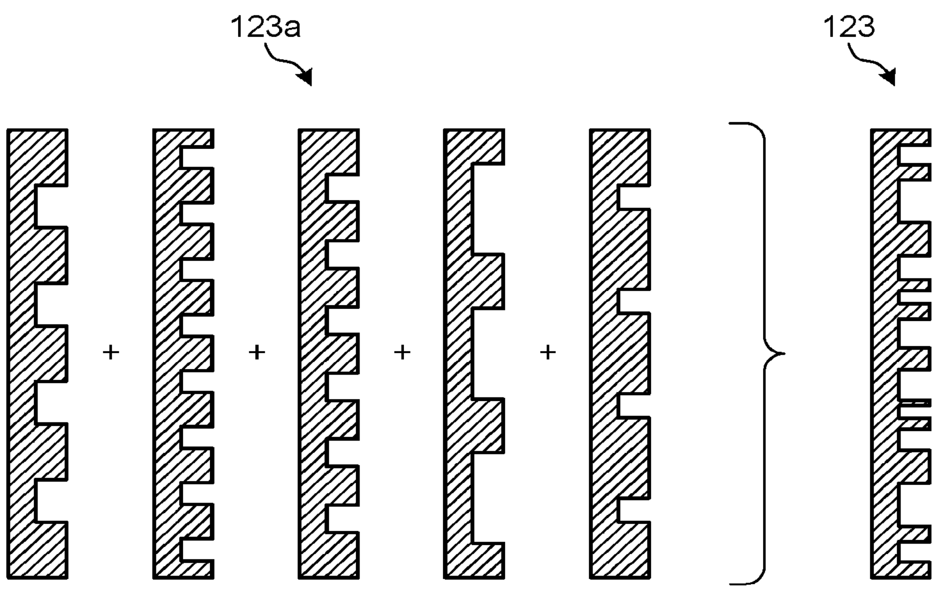
FIG. 2 is a schematic diagram for explaining a diffractive optical element.

The optical head 120 includes a diffractive optical element 123 that is arranged between the collimating lens 121 and the condensing lens 122 and that is one example of a beam shaper. The diffractive optical element 123 described herein is also referred to as a DOE, and is configured such that a plurality of diffraction gratings 123*a* with different periods are integrated as conceptually illustrated in FIG. 2. The diffractive optical element 123 is able to form a beam shape by bending the input laser light in a direction in which the input laser light is affected by each of the diffraction gratings or causing the input laser light to overlap with each other. In the present embodiment, the diffractive optical element 123 is arranged between the collimating lens 121 and the condensing lens 122, but may be installed at the side of the optical fiber 130 relative to the collimating lens 121 or at the side of the workpiece W relative to the condensing lens 122.

The diffractive optical element 123 splits the laser light input from the collimating lens 121 into a plurality of beams. Specifically, the diffractive optical element 123 splits the laser light into a main beam and a plurality of sub beams. In this case, the diffractive optical element 123 splits the laser light such that at least some of the sub beams are located anterior to the main beam in a sweep direction.

Figure 3A:
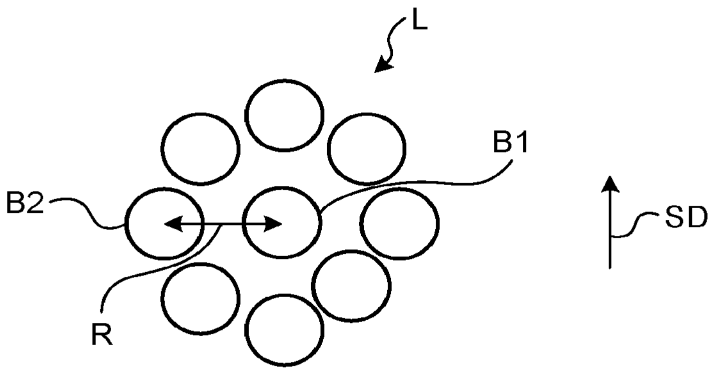
FIG. 3A is a schematic diagram for explaining an example of beam arrangement.
Figure 3B:
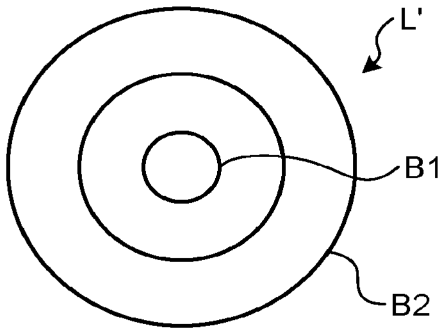
FIG. 3B is a schematic diagram for explaining an example of beam arrangement.

FIGS. 3A and 3B are schematic diagrams for explaining beam arrangement. Meanwhile, FIGS. 3A and 3B illustrate arrangement of a plurality of beams on an irradiated surface of the workpiece W irradiated with the laser light L. In the example illustrated in FIG. 3A, the laser light L is formed of a main beam B1 and a plurality of sub beams B2 that are split by the diffractive optical element 123. In the example illustrated in FIG. 3A, the number of the sub beams B2 is eight. The eight sub beams B2 are arranged so as to surround an outer periphery of the main beam B1. Specifically, the eight sub beams B2 are located so as to form an approximate ring shape with a radius R centered at the main beam B1. Further, it may say that the eight sub beams B2 are located so as to form an approximately regular octagon centered at the main beam B1 and with a distance of R between the center and each of vertices. Meanwhile, the plurality of sub beams B2 may be sequentially superposed to form a ring shape like laser light L' illustrated in FIG. 3B.

In the example illustrated in FIG. 3A, three of the sub beams B2 are located anterior to the main beam B1 in a sweep direction SD. Further, two of the sub beams B2 are located lateral to the main beam B1 in a direction perpendicular to the sweep direction SD. Furthermore, three of the sub beams B2 are located posterior to the main beam B1 in the sweep direction SD.

Moreover, each of the main beam B1 and the sub beams B2 has, for example, a power distribution in the Gaussian form in a radial direction on a beam cross section. However, the power distribution of each of the main beam B1 and the sub beams B2 is not limited to the Gaussian form. Furthermore, in FIG. 3A, a diameter of a circle representing each of the main beam B1 and the sub beams B2 corresponds to a beam diameter of each of the beams. The beam diameter of each of the beams is defined as a dimeter of a region that includes a peak of the beam and that has intensity equal to or higher than $1/e^2$ of peak intensity. As for a non-circular beam, in the present specification, a length in the direction perpendicular to the sweep direction SD in a region with intensity that is equal to or higher than $1/e^2$ of peak intensity is defined as a beam diameter.

Here, power of the main beam B1 is higher than power of each of the sub beams B2. Further, power of the eight sub beams B2 are the same.

Furthermore, a ratio of the power of the main beam B1 to total power of the eight sub beams B2 is 9:1 to 3:7. Therefore, if the ratio is 9:1, a ratio of the power of the main beam B1 to the power of the single sub beam B2 is 9:1/8=72:1. Moreover, if the ratio is 3:7, the ratio of the power of the main beam B1 to the single sub beam B2 is 3:7/8=24:7.

Meanwhile, it is preferable that at least the power distribution of the main beam B1 has a certain sharp form. If the power distribution of the main beam B1 has a certain sharp form, it is possible to increase a weld depth at the time of melting the workpiece W, so that it is possible to ensure welding strength and more preferably prevent occurrence of a welding defect. If the beam diameter is used as an index of the sharpness of the main beam B1, the beam diameter of the main beam B1 is preferably equal to or smaller than 600 μm, and is more preferably equal to or smaller than 400 μm. Meanwhile, if the main beam B1 has a sharp form, it is possible to reduce power needed to achieve the same weld depth and it is possible to increase a processing speed. Therefore, it is possible to achieve reduction of power consumption of the laser welding apparatus 100 and improvement of processing efficiency. The power distributions of the sub beams B2 may be as sharp as the power distribution of the main beam B1.

The beam diameter may be designed by appropriately setting properties of the laser device 110, the optical head 120, and the optical fiber 130 that are to be used. For example, the beam diameter may be set by setting a beam diameter of laser light that is input from the optical fiber 130 to the optical head 120 or by setting the optical systems, such as the diffractive optical element 123, the lens 121, and the lens 122.

If welding is to be performed by using the laser welding apparatus 100, the workpiece W is firstly arranged in a region that is to be irradiated with the laser light L. Subsequently, while irradiating the workpiece W with the laser light L including the main beam B1 and the eight sub beams B2 that are split by the diffractive optical element 123, the laser light L and the workpiece W are relatively moved to sweep the laser light L and a portion irradiated with the laser light L in the workpiece W is melted and welded. In the case of FIG. 1, the sweep direction is a front direction or a depth direction in the figure, for example. In this manner, the workpiece W is welded.

In this case, three beams as a part of the eight sub beams B2 in the laser light L are located anterior to the main beam B1 in the sweep direction SD, and the ratio of the power of the main beam B1 to the total power of the eight sub beams B2 is 9:1 to 3:7, so that it is possible to prevent occurrence of a welding defect, such as a blowhole.

Further, in the examples illustrated in FIGS. 3A and 3B, the eight sub beams B2 in the laser light L are located so as to form an approximate ring shape centered at the main beam B1, so that even if the sweep direction is changed from the sweep direction SD indicated in FIGS. 3A and 3B to an arbitrary direction, some of the sub beams B2 are located anterior to the main beam B1 in the changed sweep direction. Therefore, it is possible to achieve the effect of preventing occurrence of a welding defect in an arbitrary sweep direction.

Next, as an experimental example, an experiment was performed in which a plate material made of pure copper and with a thickness of 10 mm was irradiated, as a workpiece, with laser light by using a laser welding apparatus configured as illustrated in FIG. 1. Laser light output from a laser device had a wavelength of 1070 nm and power of 6 kW. Further, the experiment was performed with and without use of a diffractive optical element (DOE).

Figure 4:
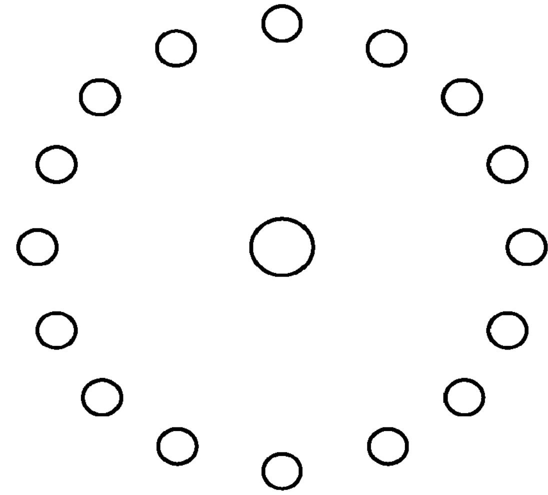
FIG. 4 is a schematic diagram for explaining arrangement of a plurality of beams of laser light according to an example.

In the case of using a DOE, seven DOEs were prepared, each of which was designed to split laser light into a main beam and 16 sub beams that were located so as to form an approximate ring shape centered at the main beam as illustrated in FIG. 4. A diameter 2R of the ring shape was set to 450 μm on a surface of the workpiece. Further, the sweep direction is an upward direction in the figure. Furthermore, each of the DOEs was designed such that a ratio of power of the main beam to total power of the 16 sub beams was 9:1, 8:2, 7:3, 6:4, 5:5, 3:7, or 2:8 and the power of all of the 16 sub beams were the same. Moreover, the ratio of the power of the main beam to the total power of the 16 sub beams was 9:1 to 3:7. Therefore, if the ratio was 9:1, the ratio of the power of the main beam to the power of the single sub beam was 9:1/16=144:1. Furthermore, if the ratio was 3:7, the ratio of the power of the main beam to the power of the single sub beam was 3:7/16=48:7.

Moreover, a sweep rate of the laser light with respect to the workpiece was set to 0.5 m/min, 1 m/min, 2 m/min, 5 m/min, 10 m/min, and 20 m/min.

An experimental result is illustrated in Table 1. A power ratio in Table (center:outer periphery) indicates the ratio of the power of the main beam to the total power of the sub beams. Further, symbols "○", "Δ", and "x" indicate visually obtained determination results of a state of an irradiated portion (irradiated portion state). Specifically, in a case in which a DOE was not used (corresponding to the power ratio of 10:0), the symbol "○" indicates that the irradiated portion state was good. The symbol "Δ" indicates that the irradiated portion state was relatively good but a blowhole occurred. The symbol "x" indicates that a groove was formed in the irradiated portion and it was impossible to form a bead. In cases of 9:1 to 2:8 in which the DOEs were mounted, "○" indicates that a rate of occurrence of blowholes was equal to or smaller than 1/10, "Δ" indicates that the rate of occurrence of blowholes was equal to or smaller than 1/2, "▲" indicates that the rate of occurrence of blowholes was equal to or smaller than 1/2 but better than the case in which a DOE was not mounted, "×" indicates that the state was not improved or got worse than the case in which a DOE was mounted, and blank indicates that processing was not induced.

As illustrated in Table 1, when a DOE was not used, and if the sweep rate was set to high speed, such as 20 m/min, the irradiated portion state was good. However, if the sweep rate was reduced to 10 m/min, a blowhole occurred, and, if the sweep rate was further reduced to 1 m/min, it was impossible to form a bead.

In contrast, when the DOEs were used with the power ratios of 9:1 to 3:7, the irradiated portion state was good even if the sweep rate was reduced to 5 m/min. In particular, when the power ratio was 8:2 to 5:5, the irradiated portion state was good even if the sweep rate was reduced to 1 m/min. Further, when the power ratio was 7:3, the irradiated portion state was good even if the sweep rate was reduced to 0.5 m/min.

TABLE 1

| Power ratio | Sweep rate [m/min] | | | | | |
|---|---|---|---|---|---|---|
| (center:outer periphery) | 20 | 10 | 5 | 2 | 1 | 0.5 |
| 10:0 (No DOE) | ○ | Δ | Δ | Δ | x | x |
| 9:1 | ○ | ○ | ○ | ○ | Δ | Δ |
| 8:2 | ○ | ○ | ○ | ○ | ○ | Δ |
| 7:3 | ○ | ○ | ○ | ○ | ○ | ○ |
| 6:4 | ○ | ○ | ○ | ○ | ○ | Δ |
| 5:5 | ○ | ○ | ○ | ○ | ○ | Δ |
| 3:7 | | ○ | ○ | Δ | Δ | ▲ |
| 2:8 | | | Δ | Δ | ▲ | ▲ |

Figure 5:
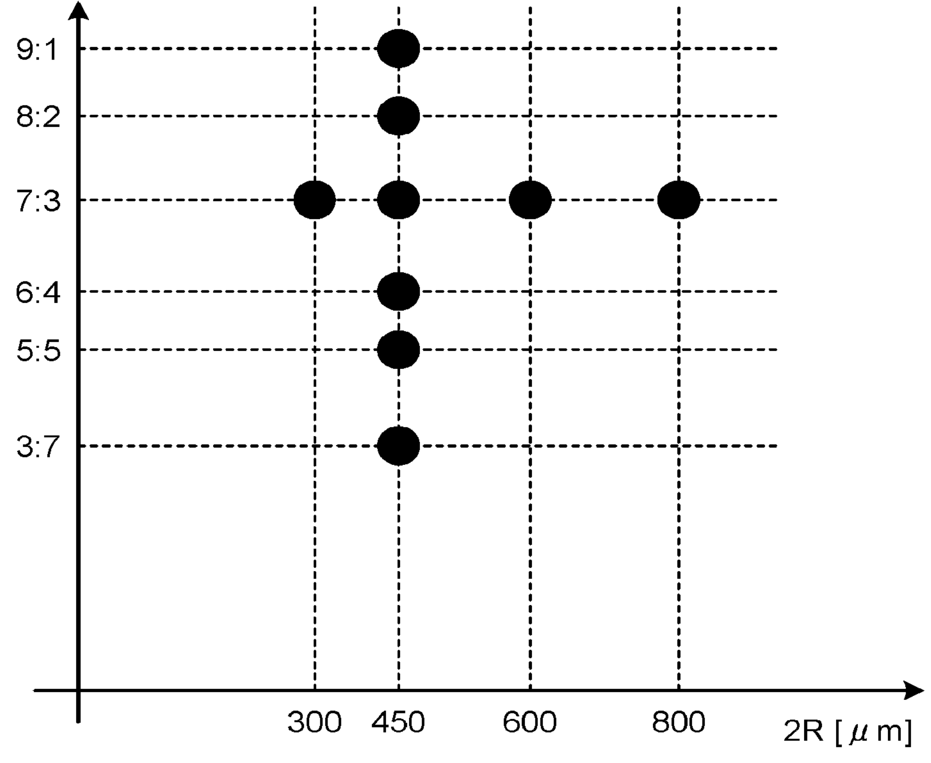
FIG. 5 is a diagram illustrating representative conditions under which an irradiated portion state was good in an experiment.

Subsequently, the same irradiation experiment as described above was performed by using DOEs, each of which was designed such that the ratio was set to 7:3 and the diameter 2R of an approximate circle of the approximate ring shape formed by the 16 sub beams on the surface of the workpiece was set to 300 μm, 600 μm, or 800 μm. Meanwhile, the sweep rate was set to 5 m/min. Further, when each of the DOEs was used, a distance between the center of each of the sub beams and the center of the main beam was about 150 μm, about 300 μm, or about 150 μm. As a result of the experiment, in each of the cases in which the diameter 2R was set to 300 μm, 600 μm, and 800 μm, the irradiated portion state was good. FIG. 5 is a diagram illustrating representative conditions under which the irradiated portion state was good in the two experiments as described above. As can be seen from the result, the distance (corresponding to the radius R) between the center of the most adjacent sub beam and the center of the main beam is preferably set to 150 μm to 400 μm.

Subsequently, the same irradiation experiment as described above was performed by using a DOE, which was designed such that the ratio was set to 7:3 and the diameter 2R of an approximate circle of the approximate ring shape formed by the 16 sub beams on the surface of the workpiece was set to 150 μm. In this case, the distance between the center of each of the sub beams and the center of the main beam was about 75 μm. Laser light output from a laser device had a wavelength of 1070 nm and power of 900 W. Further, the sweep rate was set to 200 mm/sec. Furthermore, a workpiece was constructed by arranging two pure copper plates, each having a thickness of 10 mm, to be adjacent to and butt against each other, and butt welding was performed. As a result of the experiment, the irradiated portion state was good. In contrast, an experiment was performed without using a DOE under conditions in which laser light had the same wavelength and the same power and the same sweep rate and the same workpiece were adopted, and it was observed that sputter occurred from a portion irradiated with the laser light or a welding defect occurred. According to this result, the distance (corresponding to the radius R) between the center of the most adjacent sub beam and the center of the main beam is more preferably set to 75 μm to 400 μm.

Furthermore, it may be possible to set the distance between the center of the sub beam that is located anteriorly in the sweep direction and that is most adjacent to the main beam and the center of the main beam to 75 μm to 400 μm, and set the distance between each of the sub beams that are located laterally or posteriorly in the sweep direction and the center of the main beam to a value out of the above-described range.

In the above description, the case has been described in which the laser light sweeps over the workpiece. However, the configuration of the laser light that is formed of a main beam and a plurality of sub beams such that the ratio of the power of the main beam to the total power of the plurality of sub beams is set to 72:1 to 3:7 is also effective when welding is performed without causing the laser light to sweep over a workpiece as in spot welding, for example. Meanwhile, the distance between the center of each of the sub beams adjacent to the main beam and the center of the main beam is preferably set to 75 μm to 400 μm.

In view of the above, a laser light irradiation experiment was performed by using a DOE, which is designed such that the ratio was set to 7:3 and the diameter 2R of an approximate circle of the approximate ring shape formed by the 16 sub beams on the surface of the workpiece was set to 550 μm. In this case, the distance between the center of each of the sub beams and the center of the main beam was about 275 μm. Laser light output from a laser device had a wavelength of 1070 nm and power of 5.5 kW. Further, a workpiece was constructed by bringing one edges of end surfaces of two rectangular wires each being made of pure copper and having a thickness of 1.7 mm into butting contact with each other, and butt welding was performed by irradiating and welding the end surfaces with the laser light. A laser light irradiation time was set to 100 msec. As a result of the experiment, the irradiated portion state was good. In contrast, an experiment was performed without using a DOE under conditions in which laser light had the same wavelength and the same power, and the same sweep rate and the same workpiece were adopted, and it was observed that sputter occurred from a portion irradiated with the laser light.

Other Examples of Beam Arrangement

In the first embodiment as described above, the plurality of sub beams are located so as to surround the outer periphery of the main beam, but beam arrangement is not limited to this example.

Figure 6:
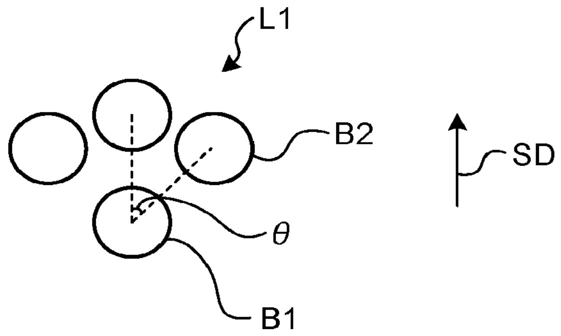
FIG. 6 is a schematic diagram for explaining another example of beam arrangement.

For example, in an example illustrated in FIG. 6, laser light L1 applied to a workpiece is split into a main beam B1 and three sub beams B2. Further, all of the three sub beams B2 are located anterior to the main beam B1 in the sweep direction SD. Power of the main beam B1 is higher than power of each of the sub beams B2. Furthermore, a ratio of the power of the main beam B1 to total power of the three sub beams B2 is 9:1 to 3:7. Even in the arrangement as described above, it is possible to prevent occurrence of a welding defect similarly to the first embodiment as described above.

Meanwhile, in the beam arrangement in the anterior direction as illustrated in FIG. 6, an angle θ between two lines each connecting a center of the main beam B1 and a center of one of the adjacent two sub beams B2 is preferably equal to or smaller than 90°, is more preferably equal to or smaller than 60°, and is even more preferably equal to or smaller than 45°.

Furthermore, it is preferable that the weld pool has approximately a line-symmetric shape with respect to the sweep direction SD; therefore, it is preferable to arrange the three sub beams B2 in a line-symmetric manner with respect to the sweep direction SD.

Moreover, as described above with reference to FIG. 4, if laser light is split into a main beam and 16 sub beams by using a DOE, it is sufficient to set a ratio of power of the main beam to power of the single sub beam to 144:1. This ratio is adopted when laser light is split into a main beam and two sub beams by using a DOE and the two sub beams are located anterior to the main beam in the sweep direction. In this case, a ratio of power of the main beam to total power of the two sub beams is 144:2=72:1. Therefore, the ratio of the power of the main beam to the total power of the two sub beams may be set to 72:1. Furthermore, if laser light is split into a main beam and three sub beams by using a DOE as illustrated in FIG. 6 and the two sub beams are located anterior to the main beam in the sweep direction, the ratio may be set to 144:3=48:1. In this manner, the ratio may have a value equal to or larger than 72:1.

Figure 7:
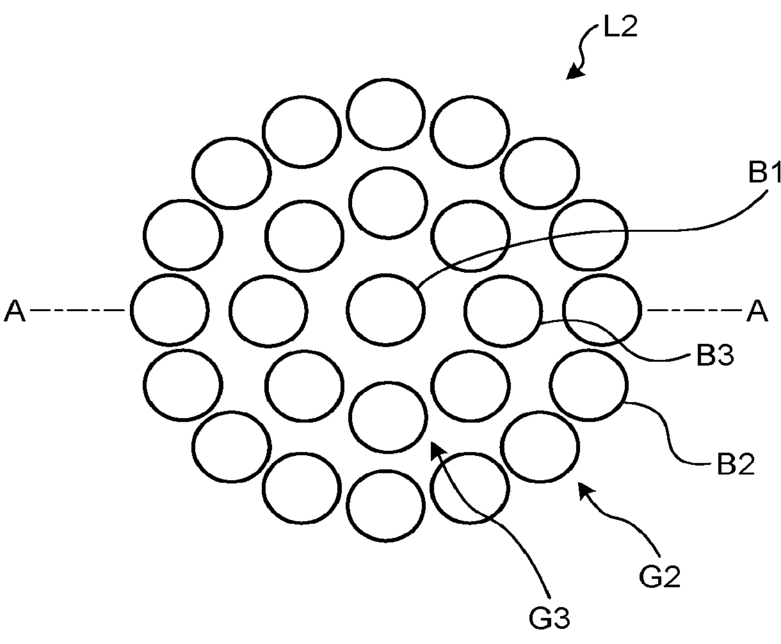
FIG. 7 is a schematic diagram for explaining still another example of beam arrangement.
Figure 8A:
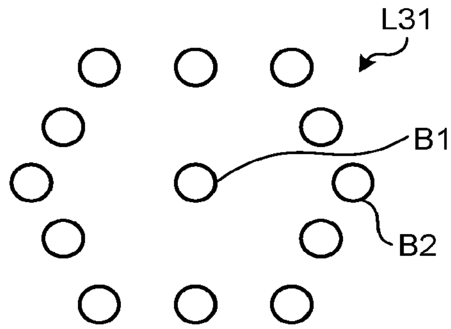
FIG. 8A is a schematic diagram for explaining still another example of beam arrangement.
Figure 8B:
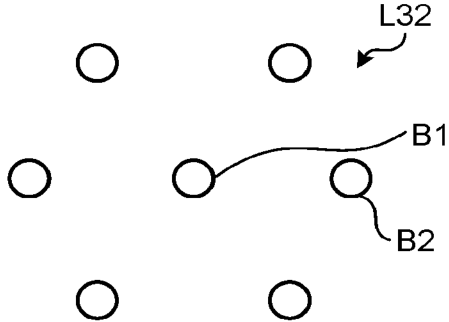
FIG. 8B is a schematic diagram for explaining still another example of beam arrangement.
Figure 8C:
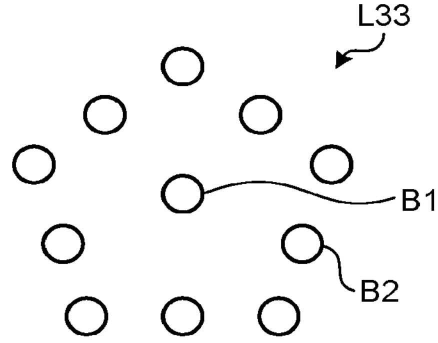
FIG. 8C is a schematic diagram for explaining still another example of beam arrangement.
Figure 8D:
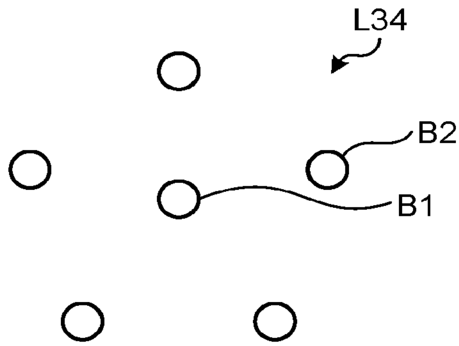
FIG. 8D is a schematic diagram for explaining still another example of beam arrangement.
Figure 8E:
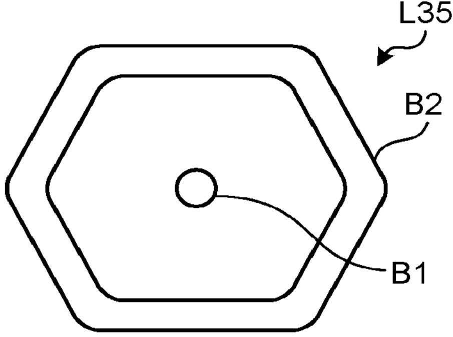
FIG. 8E is a schematic diagram for explaining still another example of beam arrangement.
Figure 8F:
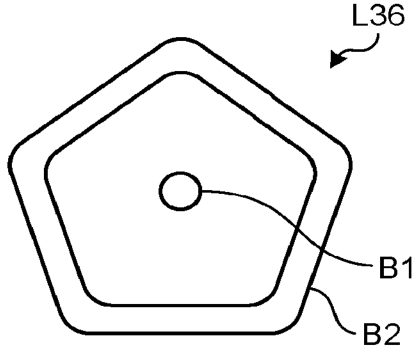
FIG. 8F is a schematic diagram for explaining still another example of beam arrangement.
Figure 8G:
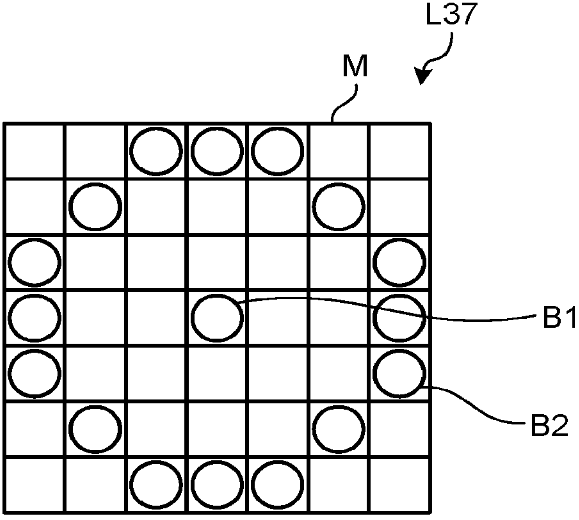
FIG. 8G is a schematic diagram for explaining still another example of beam arrangement.

Moreover, for example, in an example illustrated in FIG. 7, laser light L2 applied to a workpiece is split into a main beam B1, 16 sub beams B2, and eight sub beams B3. The 16 sub beams B2 constitute a sub beam group G2 and are located so as to form an approximate ring shape centered at the main beam B1. The eight sub beams B3 constitute a sub beam group G3 and are located so as to form an approximate ring shape that is centered at the main beam B1 and that has a smaller diameter than a diameter of the ring shape formed by the sub beams B2. A ratio of power of the main beam B1 to total power of the sub beams B2 and the sub beams B3 is 9:1 to 3:7. Even in the arrangement as described above, it is possible to prevent occurrence of a welding defect similarly to the first embodiment as described above. Furthermore, a distance between a center of the sub beam B2 that is most adjacent to the sub beam B3 and a center of the sub beam B3 is preferably set to 75 to 400 μm, similarly to a distance between a center of the sub beam B2 that is most adjacent to the main beam B1 and a center of the main beam B1.

FIGS. 8A to 8G are schematic diagrams for explaining still another examples of beam arrangement. In the example illustrated in FIG. 8A, laser light L31 is formed of a main beam B1 and 12 sub beams B2. The 12 sub beams B2 are located so as to form an approximate ring shape or an approximately regular hexagon centered at the main beam B1. In the example illustrated in FIG. 8B, laser light L32 is formed of a main beam B1 and six sub beams B2. The six sub beams B2 are located so as to form an approximate ring shape or a hexagonal shape centered at the main beam B1. In the example illustrated in FIG. 8C, laser light L33 is formed of a main beam B1 and 10 sub beams B2. The 10 sub beams B2 are located so as to form an approximate ring shape or a pentagonal shape centered at the main beam B1. In the example illustrated in FIG. 8D, laser light L34 is formed of a main beam B1 and five sub beams B2. The five sub beams B2 are located so as to form an approximate ring shape or a pentagonal shape centered at the main beam B1. In the example illustrated in FIG. 8E, laser light L35 is formed of a main beam B1 and a plurality of sub beams B2. The plurality of sub beams B2 are sequentially superposed and located so as to form an approximate ring shape or a hexagonal shape centered at the main beam B1. In the example illustrated in FIG. 8F, laser light L36 is formed of a main beam B1 and a plurality of sub beams B2. The plurality of sub beams B2 are sequentially superposed and located so as to form an approximate ring shape or a pentagonal shape centered at the main beam B1. In the example illustrated in FIG. 8G, laser light L37 is formed of a main beam B1 and 16 sub beams B2. The 16 sub beams B2 are located so as to form an approximate ring shape or an approximately octagonal shape centered at the main beam B1. Further, when a matrix M is defined, the main beam B1 and the sub beams B2 are arranged so as to fit in rectangular grids of the matrix M.

As in the examples illustrated in FIGS. 8A to 8G, the main beam B1 and the sub beams B2 may be arranged so as to fit in the grids or may be more freely arranged. Furthermore, in the examples illustrated in FIGS. 8A to 8G, the sweep direction of the laser light L31 to L37 may be set arbitrarily, or may be set to a direction deviated from diagonal lines of a pentagon or a hexagon. Moreover, the number of the sub beams that are not located anteriorly in the sweep direction may be slightly reduced as long as the sub beams are densely arranged as illustrated in FIG. 8A, FIG. 8C, FIG. 8F, and FIG. 8G.

Second Embodiment

Figure 9:
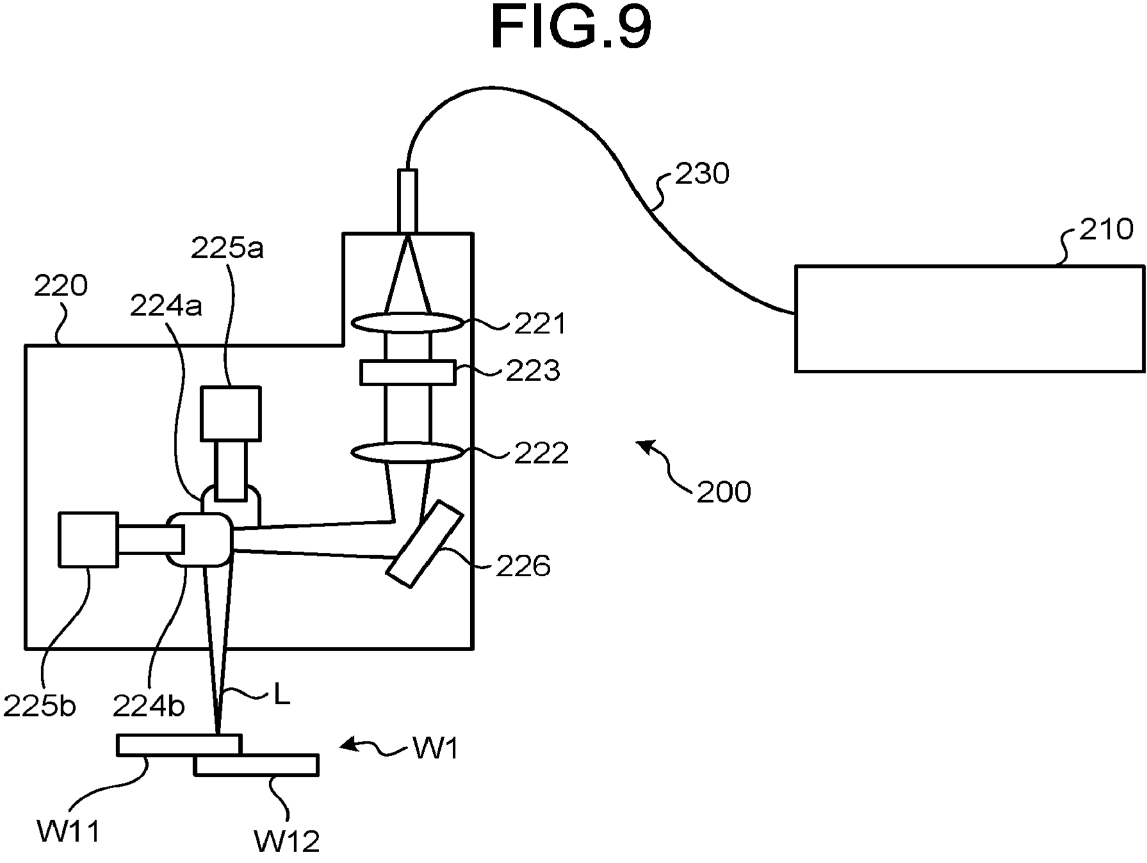
FIG. 9 is a schematic diagram illustrating an overall configuration of a laser welding apparatus according to a second embodiment.

FIG. 9 is a diagram illustrating an overall configuration of a laser welding apparatus according to a second embodiment. A laser welding apparatus 200 welds a workpiece W1 by irradiating the workpiece W1 with the laser light L. The workpiece W1 is constructed with two plate-shaped copper members W11 and W12 that are arranged in an overlapping manner. The laser welding apparatus 200 achieves welding using the same principle as that of the laser welding apparatus 100. Therefore, only an apparatus configuration of the laser welding apparatus 200 will be described below.

The laser welding apparatus 200 includes a laser device 210, an optical head 220, and an optical fiber 230.

The laser device 210 is configured in the same manner as the laser device 110, and is configured to be able to output laser light at power of several kW, for example. The optical fiber 230 guides laser light output from the laser device 210 and allows the laser light to be input to the optical head 220.

The optical head 220 is, similarly to the optical head 120, an optical device for causing the laser light input from the laser device 210 to be emitted toward the workpiece W. The optical head 220 includes a collimating lens 221 and a condensing lens 222.

The optical head 220 further includes a galvano scanner that is arranged between the condensing lens 222 and the workpiece W. The galvano scanner is a device that is able to control angles of two mirrors 224*a* and 224*b* to move a position of irradiation with the laser light L and sweep the laser light L without moving the optical head 220. The laser welding apparatus 200 includes a mirror 226 for guiding the laser light L emitted from the condensing lens 222 to the galvano scanner. Furthermore, the angles of the mirrors 224*a* and 224*b* of the galvano scanner are changed by motors 225*a* and 225*b*, respectively.

The optical head 220 includes a diffractive optical element 223 that is arranged between the collimating lens 221 and the condensing lens 222 and that is one example of a beam shaper. The diffractive optical element 223, similarly to the diffractive optical element 123, splits the laser light input from the collimating lens 221 into a main beam and a plurality of sub beams. When sweeping is to be performed, at least some of the sub beams are located anterior to the main beam in the sweep direction. Power of the main beam is higher than power of each of the sub beams, and a ratio of the power of the main beam to total power of the plurality of sub beams is 9:1 to 3:7. With this configuration, the laser welding apparatus 200 is able to prevent occurrence of a welding defect when welding the workpiece W1. Meanwhile, the ratio may be set to 72:1 to 3:7 depending on how the sub beams are split and arranged. In addition, while the diffractive optical element 223 is arranged between the collimating lens 221 and the condensing lens 222 similarly to the first embodiment, the diffractive optical element 223 may be arranged at the side of the optical fiber 230 relative to the collimating lens 221 or at the side of the workpiece W relative to the condensing lens 222.

Third Embodiment

Figure 10:
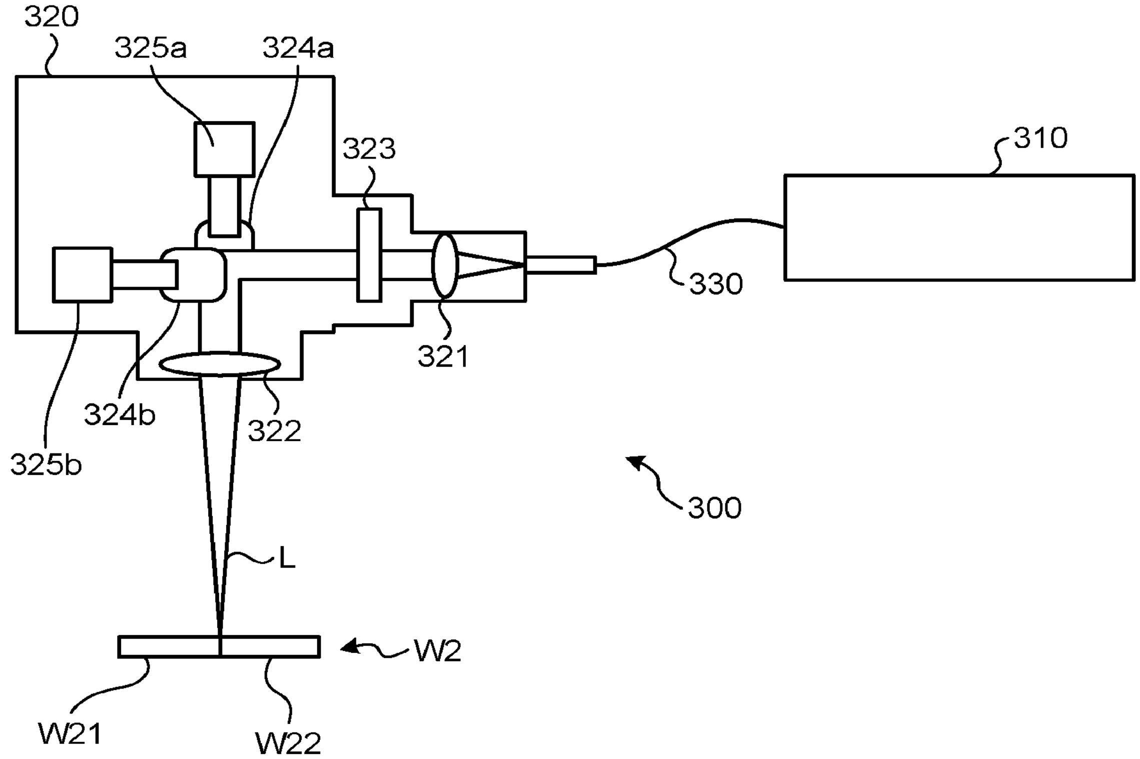
FIG. 10 is a schematic diagram illustrating an overall configuration of a laser welding apparatus according to a third embodiment.

FIG. 10 is a schematic diagram illustrating an overall configuration of a laser welding apparatus according to a third embodiment. A laser welding apparatus 300 welds a workpiece W2 by irradiating the workpiece W2 with the laser light L. The workpiece W2 was constructed with two plate-shaped copper members W21 and W22 that are arranged to be adjacent to and butt against each other. The laser welding apparatus 300 achieves welding using the same principle as those of the laser welding apparatuses 100 and 200. Configurations of components (a laser device 310 and an optical fiber 330) other than an optical head 320 are the same as those of corresponding components of the laser welding apparatuses 100 and 200. Therefore, only an apparatus configuration of the optical head 320 will be described below.

The optical head 320 is, similarly to the optical heads 120 and 220, an optical device for causing the laser light input from the laser device 310 to be emitted toward the workpiece W. The optical head 320 includes a collimating lens 321 and a condensing lens 322.

The optical head 320 further includes a galvano scanner that is arranged between the collimating lens 321 and the condensing lens 322. Angles of mirrors 324*a* and 324*b* of the galvano scanner are changed by motors 325*a* and 325*b*, respectively. In the optical head 320, the galvano scanner is arranged at a different position from that of the optical head 220. However, similarly to the optical head 220, it is possible to control the angles of the two mirrors 324*a* and 324*b* to move a position of irradiation with the laser light L and sweep the laser light L without moving the optical head 320.

The optical head 320 includes a diffractive optical element 323 that is arranged between the collimating lens 321 and the condensing lens 322 and that is one example of a beam shaper. The diffractive optical element 323, similarly to the diffractive optical elements 123 and 223, splits the laser light input from the collimating lens 321 into a main beam and a plurality of sub beams. When sweeping is to be performed, at least some of the sub beams are located anterior to the main beam in the sweep direction. Power of the main beam is higher than power of each of the sub beams, and a ratio of the power of the main beam to total power of the plurality of sub beams is 9:1 to 3:7. With this configuration, the laser welding apparatus 300 is able to prevent occurrence of a welding defect when welding the workpiece W1. Meanwhile, the ratio may be set to 72:1 to 3:7 depending on how the sub beams are split and arranged. In addition, while the diffractive optical element 323 is arranged between the collimating lens 321 and the condensing lens 322 similarly to the first embodiment, the diffractive optical element 323 may be arranged at the side of the optical fiber 330 relative to the collimating lens 321 or at the side of the workpiece W relative to the condensing lens 322.

Fourth Embodiment

Figure 11:
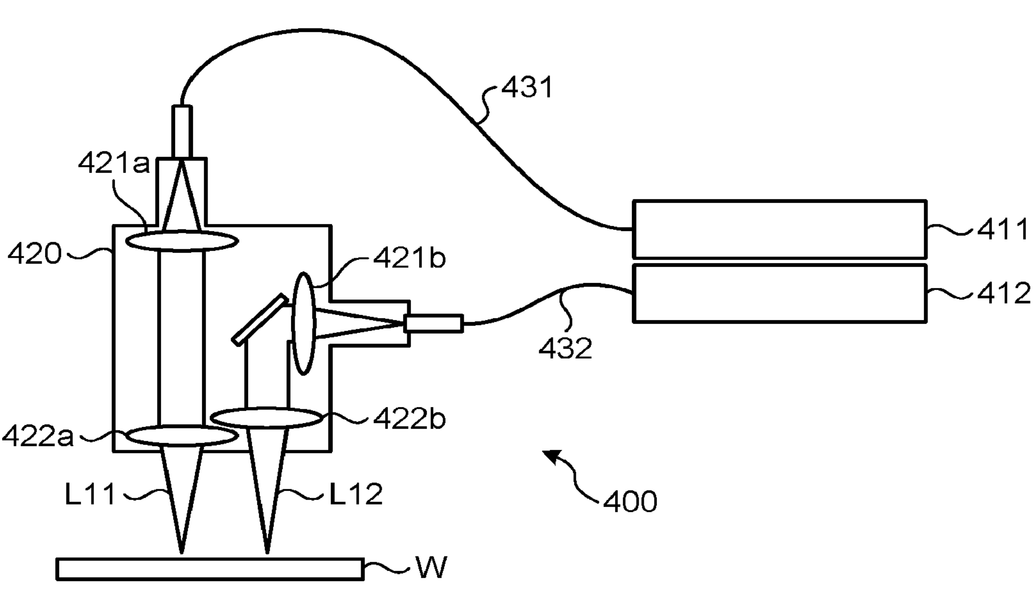
FIG. 11 is a schematic diagram illustrating an overall configuration of a laser welding apparatus according to a fourth embodiment.

FIG. 11 is a schematic diagram illustrating an overall configuration of a laser welding apparatus according to a fourth embodiment. A laser welding apparatus 400 welds a workpiece W by irradiating the workpiece W with laser light L11 and L12. The laser welding apparatus 400 achieves welding using the same principle as that of the laser welding apparatus 100. Therefore, only an apparatus configuration of the laser welding apparatus 400 will be described below.

The laser welding apparatus 400 includes a plurality of laser devices 411 and 412 that output laser light, an optical head 420 that applies the laser light to the workpiece W, and optical fibers 431 and 432 that guide the laser light output from the laser devices 411 and 412 to the optical head 420.

The laser device 411 is configured in the same manner as the laser device 110, and is configured to be able to output multi-mode laser light L11 at power of several kW, for example. The laser device 412 is configured in the same manner as the laser device 110, and is configured to be able to output laser light L12 including a plurality of beams of multi-mode laser light at power of several kW, for example.

The optical fibers 431 and 432 respectively guide the laser light L11 and L12 to the optical head 420. The optical fiber 432 may be configured with a plurality of optical fibers or configured with a multi-core fiber in order to guide the laser light L12 including a plurality of beams of laser light.

The optical head 420 is an optical device for causing the laser light L11 and L12 guided from the laser devices 411 and 412 to be emitted toward the workpiece W. The optical head 420 includes a collimating lens 421*a* and a condensing lens 422*a* for the laser light L11, and further includes a collimating lens 421*b* and a condensing lens 422*b* for the laser light L12. The collimating lenses 421*a* and 421*b* are optical systems for temporarily collimating the laser light guided by the optical fibers 431 and 432, and the condensing lenses 422*a* and 422*b* are optical systems for condensing the collimated laser light to the workpiece W. Meanwhile, the collimating lens 421*b* and the condensing lens 422*b* may be configured with a plurality of lenses in order to collimate and condense the laser light L12 including a plurality of beams of laser light.

The optical head 420 applies the laser light L11 as a main beam selected between the laser light L11 and L12 to the workpiece W, and applies the laser light L12 as a sub beam to the workpiece W. That is, the laser light applied to the workpiece W is formed of the main beam and the plurality of sub beams. Further, when sweeping is to be performed, at least some of the sub beams are located anterior to the main beam in the sweep direction. Furthermore, a ratio of power of the main beam to total power of the plurality of sub beams is 9:1 to 3:7. With this configuration, the laser welding apparatus 400 is able to prevent occurrence of a welding defect when welding the workpiece W. Meanwhile, the ratio may be set to 72:1 to 3:7 depending on how the sub beams are split and arranged.

According to the laser welding apparatus 400, it is possible to achieve arrangement as illustrated in FIGS. 3A, 3B, 4, 6, 7, and 8A to 8G, for example. While the laser light L11 and L12 are used in the example illustrated in the figure, the number of beams of the laser light may be increased or decreased appropriately.

Fifth Embodiment

Figure 12:
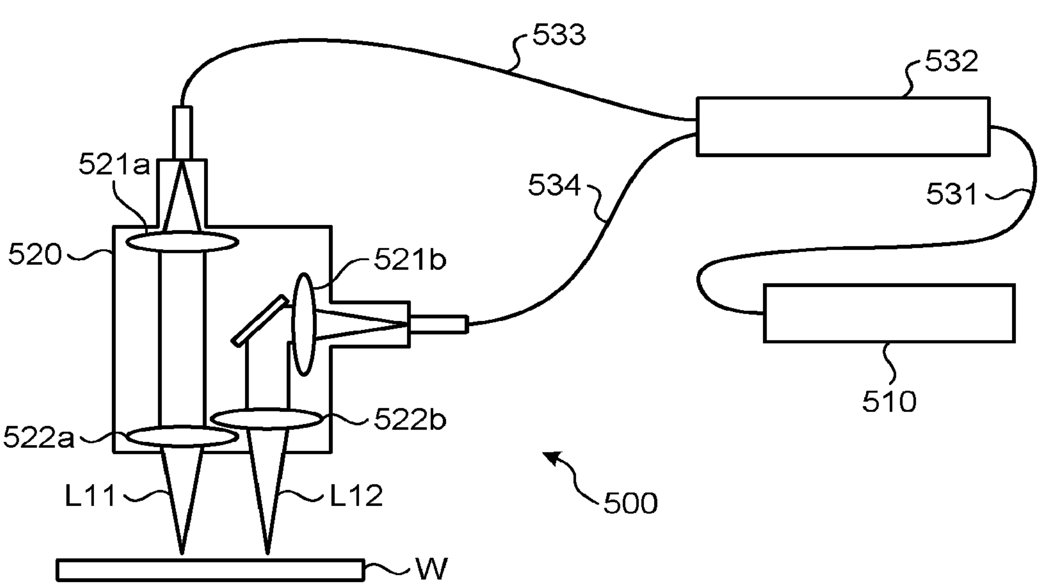
FIG. 12 is a schematic diagram illustrating an overall configuration of a laser welding apparatus according to a fifth embodiment.

FIG. 12 is a schematic diagram illustrating an overall configuration of a laser welding apparatus according to a fifth embodiment. A laser welding apparatus 500 welds a workpiece W by irradiating the workpiece W with laser light L11 and L12. The laser welding apparatus 500 achieves welding using the same principle as that of the laser welding apparatus 100. Therefore, only an apparatus configuration of the laser welding apparatus 500 will be described below.

The laser welding apparatus 500 includes a laser device that outputs laser light, an optical head 520 that applies the laser light to the workpiece W, and optical fibers 531, 533, and 534 that guide the laser light output from the laser device 510 to the optical head 520.

A laser device 510 is configured in the same manner as the laser device 110, and is configured to be able to output multi-mode laser light at power of several kW, for example. The laser device 510 is used to output both of the laser light L11 and L12 for irradiating the workpiece W. For this purpose, a bifurcation unit 532 that guides the laser light output from the laser device 510 to the optical head 520 is arranged between the optical fibers 531, 533, and 534. The laser device 510 is configured to bifurcate the laser light output from the laser device 510 into a plurality of beams of laser light and thereafter guide the beams of laser light to the optical head 520.

The optical fibers 531 and 533 respectively guide the laser light L11 and L12 to the optical head 520. The optical fiber 533 may be configured with a plurality of a plurality of optical fibers or configured with a multi-core fiber in order to guide the laser light L12 including a plurality of beams of laser light.

The optical head 520 is an optical device for applying the laser lights L11 and L12, which are bifurcated by the bifurcation unit 532 and guided by the optical fibers 531 and 533, to the workpiece W. For this purpose, the optical head 520 includes a collimating lens 521*a* and a condensing lens 522*a* for the laser light L11, and further includes a collimating lens 521*b* and a condensing lens 522*b* for the laser light L12. The collimating lenses 521*a* and 521*b* are optical systems for temporarily collimating the laser light guided by the optical fibers 533 and 534, and the condensing lenses 522*a* and 522*b* are optical systems for condensing the collimated laser light to the workpiece W. Meanwhile, the collimating lens 521*b* and the condensing lens 522*b* may be configured with a plurality of lenses in order to collimate and condense the laser light L12 including a plurality of beams of laser light.

The optical head 520 applies the laser light L11 as a main beam selected between the laser light L11 and L12 to the workpiece W, and applies the laser light L12 as a sub beam to the workpiece W. That is, the laser light applied to the workpiece W is formed of the main beam and the plurality of sub beams. Further, when sweeping is to be performed, at least some of the sub beams are located anterior to the main beam in the sweep direction. Furthermore, a ratio of power of the main beam to total power of the plurality of sub beams is 9:1 to 3:7. With this configuration, the laser welding apparatus 500 is able to prevent occurrence of a welding defect when welding the workpiece W. Meanwhile, the ratio may be set to 72:1 to 3:7 depending on how the sub beams are split and arranged.

According to the laser welding apparatus 500, it is possible to achieve arrangement as illustrated in FIGS. 3A, 3B, 4, 6, 7, and 8A to 8G. While the laser light L11 and L12 are used in the example illustrated in the figure, the number of beams of the laser light may be increased or decreased appropriately.

Sixth Embodiment

Figure 13:
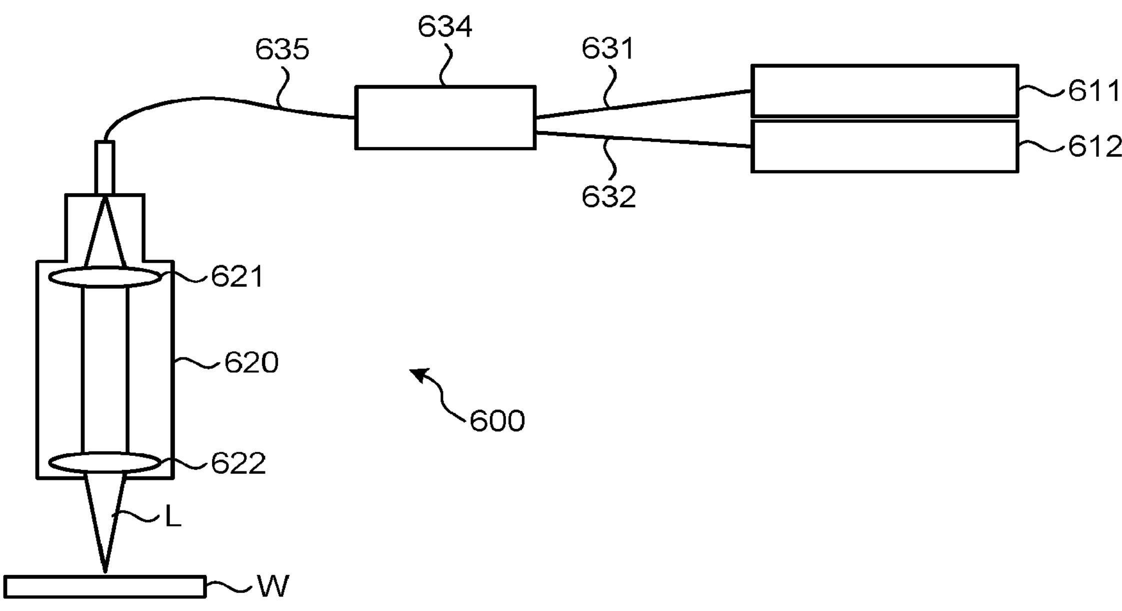
FIG. 13 is a schematic diagram illustrating an overall configuration of a laser welding apparatus according to a sixth embodiment.

FIG. 13 is a schematic diagram illustrating an overall configuration of a laser welding apparatus according to a sixth embodiment. A laser welding apparatus 600 welds a workpiece W by irradiating the workpiece W with laser light. The laser welding apparatus 600 achieves welding using the same principle as that of the laser welding apparatus 100. Therefore, only an apparatus configuration of the laser welding apparatus 600 will be described below.

The laser welding apparatus 600 includes a plurality of laser devices 611 and 612 that output laser light, an optical head 620 that applies the laser light to the workpiece W, and optical fibers 631, 632, and 635 that guide the laser light output from the laser devices 611 and 612 to the optical head 620.

The laser device 611 is configured in the same manner as the laser device 110, and is configured to be able to output multi-mode laser light at power of several kW, for example. The laser device 612 is configured in the same manner as the laser device 110, and is configured to be able to output laser light including a plurality of beams of multi-mode laser light at power of several kW, for example.

In the laser welding apparatus 600, the laser light output from the laser devices 611 and 612 are coupled before being guided to the optical head 620. For this purpose, a coupler unit 634 that guides the laser light output from the laser devices 611 and 612 to the optical head 620 is arranged between the optical fibers 631, 632, and 635. The laser light output from the laser device 611 and the laser light output from the laser device 612 are guided in parallel to each other in the optical fiber 635.

Figure 14A:
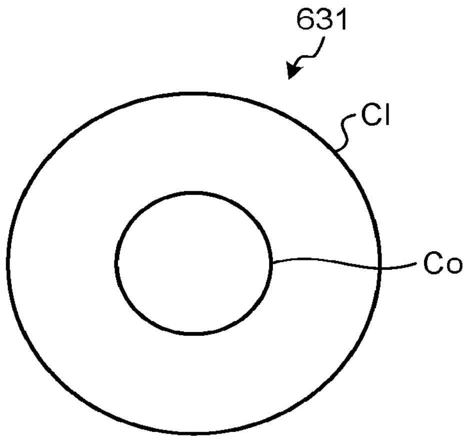
FIG. 14A is a diagram illustrating a configuration example of an optical fiber.
Figure 14B:
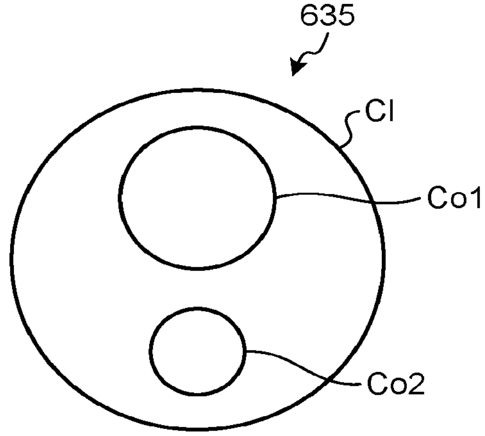
FIG. 14B is a diagram illustrating a configuration example of an optical fiber.

Configuration examples of the optical fiber 631 (and 632) and the optical fiber 635 will be described below with reference to FIGS. 14A and 14B. As illustrated in FIG. 14A, the optical fiber 631 (and 632) is a general optical fiber. That is, the optical fiber 631 (and 632) is an optical fiber in which cladding C1 having a refractive index lower than a refractive index of a single core region Co is formed around the core region Co. In contrast, as illustrated in FIG. 14B, the optical fiber 635 is a multi-core optical fiber. That is, the optical fiber 635 includes two core regions Co1 and Co2, and the cladding C1 having a refractive index lower than a refractive index of the two core regions Co1 and Co2 is formed around the core regions Co1 and Co2. Furthermore, the core region Co2 includes a plurality of core regions. Then, in the coupler unit 634, the core region Co of the optical fiber 631 and the core region Co1 of the optical fiber 635, and the core region Co of the optical fiber 632 and the core region Co2 of the optical fiber 635 are coupled. Each of the beams of laser light output from the laser device 612 is guided by the plurality of core regions in the core region Co2.

FIG. 13 is referred to again. The optical head 620 is an optical device for applying the laser light L coupled by the coupling unit 634 to the workpiece W. For this purpose, the optical head 620 includes a collimating lens 621 and a condensing lens 622 inside thereof.

The laser welding apparatus 600 does not include a diffractive optical element in the optical head 620 and does not include an independent optical system for a plurality of beams of laser light; however, the laser light output from the laser devices 611 and 612 are coupled before being guided to the optical head 620. Therefore, the laser light L emitted toward the workpiece W is formed of a main beam and a plurality of sub beams. Further, when sweeping is to be performed, at least some of the sub beams are located anterior to the main beam in the sweep direction. Furthermore, a ratio of power of the main beam to total power of the plurality of sub beams is 9:1 to 3:7. With this configuration, the laser welding apparatus 600 is able to prevent occurrence of a welding defect when welding the workpiece W. Meanwhile, the ratio may be set to 72:1 to 3:7 depending on how the sub beams are arranged.

According to the laser welding apparatus 600, it is possible to achieve arrangement as illustrated in FIGS. 3A, 3B, 4, 6, 7, and 8A to 8G. While the laser light output from the laser devices 611 and 612 are used in the example illustrated in the figure, the number of beams of laser light may be increased or decreased appropriately.

In the embodiments as described above, the split main beam and the plurality of sub beams do not overlap with one another, but the main beam and the sub beams may overlap with one another or the sub beams may overlap with one another.

Furthermore, all of the sub beams may have the same power, or one or some of the sub beams may have higher power than power of the other sub beams. Moreover, the plurality of sub beams may be classified into a plurality of groups, and the sub beams in the same group have approximately the same power, and the sub beams in different groups may different power. In this case, if the sub beams classified into a plurality of different groups are compared with one another, the power varies in a stepwise manner. Meanwhile, the number of sub beams included in a certain group is not limited to plural, but may be singular. In any case, a ratio of power of the main beam to total power of the plurality of sub beams is preferably set to 72:1 to 3:7.

Furthermore, the workpiece is not limited to a plate material, and a mode of welding is not limited to lap welding and butt welding. Therefore, the workpiece may be constructed by arranging at least two members to be welded such that the two members overlap with each other, come into contact with each other, or are adjacent to each other.

Moreover, when laser light is caused to sweep over the workpiece, it may be possible to perform sweeping by well-known wobbling or weaving to increase a surface area of a weld pool.

Furthermore, laser light to be used is not limited to multi-mode laser light, but single-mode light may be used.

Moreover, a workpiece may be a plated copper plate that includes a thin metal layer on a surface of copper. Furthermore, the examples in which the workpiece has a thickness of about 1 mm to 10 mm have been described, the thickness may further be reduced to about 0.01 mm.

The present disclosure is not limited to the embodiments described above. Configurations made by appropriately combining structural elements in each of the embodiments described above are also in the scope of the present disclosure. In addition, additional effects and modifications may be easily derived by a person skilled in the art. Therefore, the broader aspects of the present disclosure are not limited to the above-described embodiments, and various modifications may be made.

INDUSTRIAL APPLICABILITY

The present disclosure is preferably applied to welding of a workpiece containing copper.

According to the present disclosure, it is possible to prevent occurrence of a welding defect, such as a blowhole, when a workpiece containing copper is subjected to laser welding.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A welding method comprising:

arranging a workpiece containing copper in a region to be irradiated with laser light; and moving the laser light and the workpiece relative to each other while irradiating the workpiece with the laser light and sweeping the laser light over the workpiece at a sweep rate of 1 m/min to 20 m/min to melt and weld an irradiated portion of the workpiece, wherein the laser light is formed of a main beam and a plurality of sub beams, and a ratio of power of the main beam to total power of the plurality of sub beams is 8:2 to 5:5.

2. The welding method according to claim 1, wherein the plurality of sub beams are located so as to surround an outer periphery of the main beam.

3. The welding method according to claim 2, wherein the plurality of sub beams are located so as to form an approximate ring shape centered at the main beam.

4. The welding method according to claim 3, wherein a distance between a center of a sub beam that is most adjacent to the main beam and a center of the main beam is 75 μm to 400 μm.

5. The welding method according to claim 1, further comprising:

moving the laser light and the workpiece relative to each other while the workpiece is irradiated with the laser light, thereby causing the laser light to sweep over the workpiece, wherein at least some of the plurality of sub beams are located anterior to the main beam in a sweep direction.

6. The welding method according to claim 1, wherein the workpiece includes at least two members to be welded, and the workpiece is arranged in a region to be irradiated with the laser light such that the at least two members overlap with each other, come into contact with each other, or are adjacent to each other.

7. The welding method according to claim 1, further comprising:

splitting, by a beam shaper, the laser light into the main beam and the plurality of sub beams; and irradiating the workpiece with the laser light.

8. The welding method according to claim 7, wherein the beam shaper is a diffractive optical element.

9. A welding method comprising:

arranging a workpiece containing copper in a region to be irradiated with laser light; and irradiating the workpiece with the laser light to melt and weld an irradiated portion of the workpiece, wherein the laser light is formed of a main beam and a plurality of sub beams, a ratio of power of the main beam to total power of the plurality of sub beams is 72:1 to 3:7, the plurality of sub beams are located so as to surround an outer periphery of the main beam, the plurality of sub beams are located so as to form an approximate ring shape centered at the main beam, and a distance between a center of a sub beam that is most adjacent to the main beam and a center of the main beam is 75 μm to 400 μm.

* * * * *